A. P. PHILLIPS.
FOOT MEASURING DEVICE.
APPLICATION FILED JUNE 6, 1916.

1,331,823.

Patented Feb. 24, 1920.

Witnesses

A. P. Phillips
Inventor by
Attorneys

UNITED STATES PATENT OFFICE.

AUSTAVE PAUL PHILLIPS, OF ATLANTA, GEORGIA, ASSIGNOR, BY MESNE ASSIGNMENTS, TO THE FOOTOGRAPH COMPANY, A CORPORATION OF MASSACHUSETTS.

FOOT-MEASURING DEVICE.

1,331,823.    Specification of Letters Patent.    Patented Feb. 24, 1920.

Application filed June 6, 1916. Serial No. 101,989.

*To all whom it may concern:*

Be it known that I, AUSTAVE P. PHILLIPS, a citizen of the United States, residing at Atlanta, in the county of Fulton and State of Georgia, have invented a new and useful Foot-Measuring Device, of which the following is a specification.

The primary object of the invention is to provide a universal foot measuring and shoe fitting device which can be used for measuring and determining the sizes of shoes for feet of both adults and children, one set of scales being applicable in all instances, as distinguished from those devices which require independent scales for men, women and children, or for adults and children; and furthermore to provide such a measuring device in a compact and simple form such that it can be used for example in mail order traffic and by inexperienced customers and clerks under such conditions as to avoid error in the deduction.

A further object of the invention is to provide a chart which can be used as a medium of advertising for the house by which it is issued, and at the same time may be employed as a sales and record slip and adapted to be filed as a record of sales and for reference and information on repeat orders.

With these and other objects in view as will appear from the following description, the invention consists in the combination and arrangement of parts hereinafter fully described, it being understood that changes in the form, proportions and details of construction may be resorted to without departing from the spirit of the invention.

In the drawings wherein a preferred embodiment of the invention is disclosed,—

Figure 1:
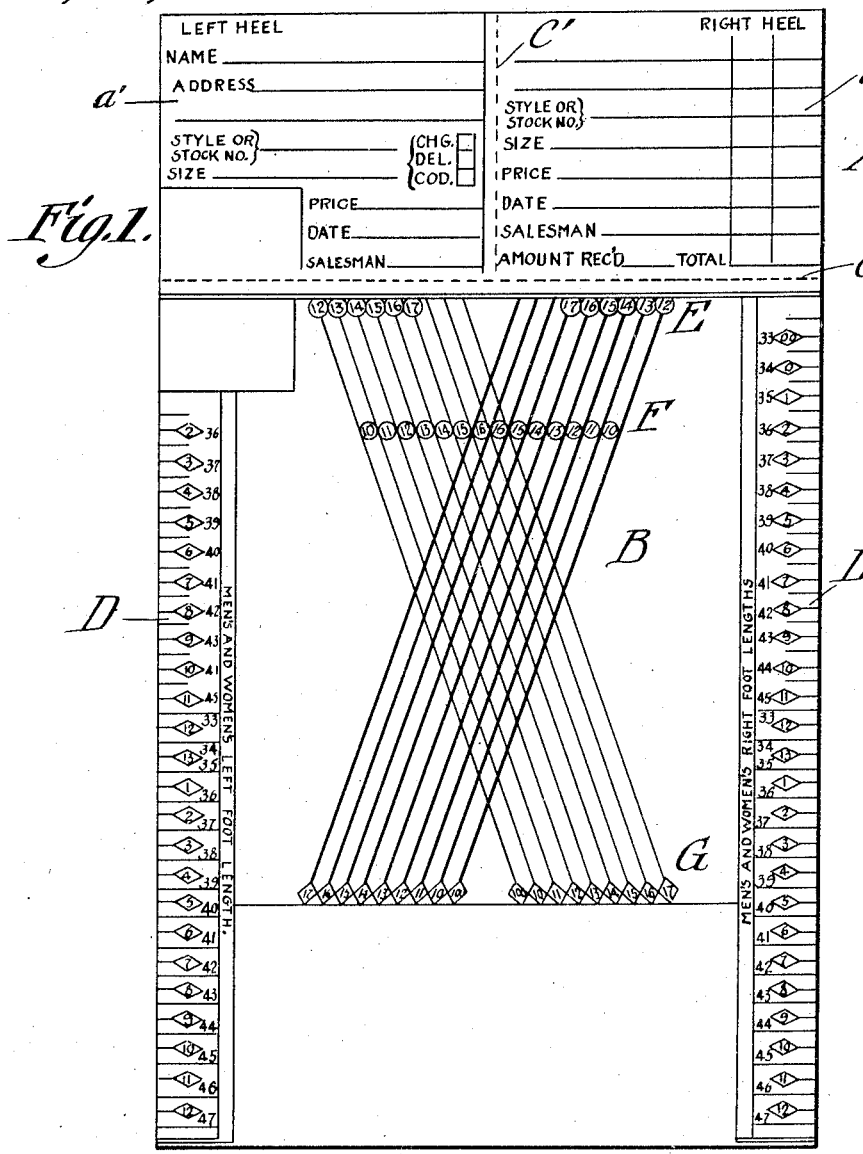
Figure 1 is a plan view of a combined adults' and children's foot measuring scale sheet showing the attached sales and record slip connected therewith on a transverse perforated separation line.

The chart preferably embodies a detachable sales slip A, separable from the body portion B of the chart on a perforated line C, the sales slip and the body portion of the chart being identified by corresponding sales numbers and the sales slip being provided with spaces or blanks for the name, address, style, size and width of shoe, price, initials of the salesman, number and dates of sales, etc., while the body portion of the chart in the spaces between the graduations is adapted to carry the advertising matter of the house of issue of the chart.

As shown in the drawing this sales slip may be divided on a perforated line C' to permit easy separation of the members thereof to constitute a wrapper's or package identifying check *a* and an office or record check *a'*, or equivalent thereof.

In the illustrated embodiment of the invention, in order to secure compactness and at the same time provide independent scales for the right foot and left foot of the customer, the foot length scales D are arranged parallel with the side edges of the chart and between them are arranged the foot width scales, each of which consists of a series of parallel lines disposed diagonally or divergently, from heel to toe, with respect to the corresponding foot length scale. To economize in width of the chart, these width scales are disposed to cross each other between the heel and toe.

These foot width scales may be distinguishably designated, to prevent confusion, as, for example by using heavy lines for the right foot widths and relatively light lines for the left foot widths or they may be distinguished by colors.

Each foot length scale, as illustrated, is provided with graduations, arranged for example in diamonds and which are respectively designated to represent standard last numbers or lengths. In the drawings, these designations are shown at the outer side of each foot length scale, while set inward therefrom but comparable therewith are numerals or other designations representing the standard French size scales, the numerals in this scale ranging as illustrated, from 33 to 47 inclusive. The foot width scale graduations which are represented by parallel lines, are designated in the drawing by numerals but may be otherwise designated, as by letters, according to the preference of the dealer.

In practice, the proper shoe length scale differs from the last size or last number scale, as it has been standardized, although bearing a definite relation thereto, it having been found that in order to provide a comfortable and proper fit for a foot, it is necessary to add approximately two and one-half last sizes to the reading of the last size scale measurement for adults, or from one and one-half to two sizes for children, and therefore the extent of divergence of the foot width scale from the line of the foot length scale must be such that the reading of a given length must agree with the reading of a given last width, even though the actual length and width as indicated on the chart represent an actual last size or number which is less than that required in the shoe for a proper and comfortable fit of the foot measured. The extent or angle of this divergence has been found to be about 20 degrees, as shown in the drawing, slight variations one way or the other, however, being possible without materially affecting the practicability of the chart.

For convenience, the standard last scale is used and correction as to length to give the proper size of shoe, or the "extension" as it is termed in the trade, is made mentally by adding two and one-half sizes for adults, etc., or by reference to the standard French shoe size scale indicated on the chart by the numerals 33 to 47 inclusive, said French shoe size scale being worked out to represent actual shoe sizes for the measurements of foot indicated. This French scale automatically makes the required correction for length or extension by giving the proper shoe length or shoe number for each graduation. It will be understood that either scale may be used independently of the other.

For example, if the standard last size scale is being used and the length of the foot being measured is found to reach the numeral indicating a number 3 last, the proper shoe number will be 5½, whereas on the French scale it would be 37½ and that will be the number of the shoe, size 5½, which will properly fit a foot of that measurement.

Owing to the arrangement of the foot width scale, however, it is not necessary to make such correction mentally or otherwise. If the foot measure at the widest part indicates a 14 last for example, the 14 last in the 5½ shoe will properly fit the foot of the 3 length. In other words, the foot width scale makes its own correction, notwithstanding the increase or extension which is read into the measurement as described with reference to the foot length scale.

It will be noted that the angle of the width scale with reference to the length scale is determined by relative increase of width and length in standard last measurements of the same last width designation. That is to say, last No. 4 is wider in the 14 width than last No. 3, and last No. 5 is wider in the 14 width than last No. 4, and so on, but this compensation is taken care of by the angular position of the graduations of the width scale and moreover is applicable to all sizes, including those used for men, women and children.

While the form of chart shown in the drawings is desirable, being applicable to all sizes, it is of course apparent that separate charts constructed along the lines proposed may be used for each class of shoes, one chart, for example, for men, one for women and one for children. While such charts are more accurate, the chart shown in the drawings is well devised and sufficient for all practical purposes.

However, in adapting the foot width scale, as a uniform or common scale for children and adults, (men and women) owing to the physiological differences in proportions, or ratios of widths to lengths, the specific designations of widths may be differentiated by placing the children's foot width measurements in partial circles on the lines at the heel ends thereof (E), the women's foot width measurements in circles between the lines at an intermediate point thereof (F), and the men's foot-width measurements in diamonds on the lines at the toe-ends thereof (G). This tends to prevent confusion on the part of the salesman in reading the chart to apply the proper shoe to the foot being measured.

Figure 2:
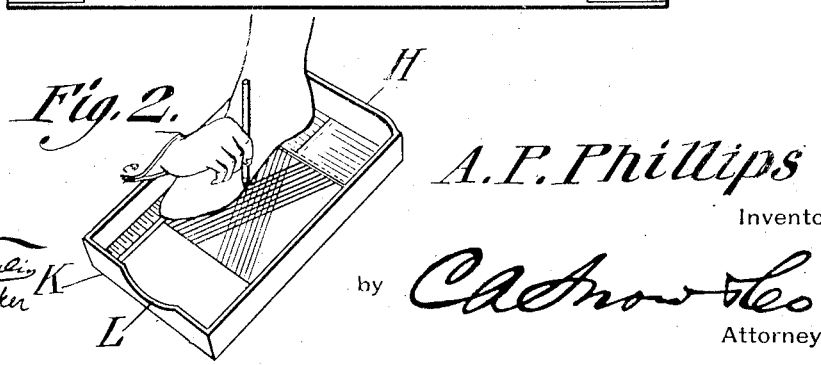
Fig. 2 is a perspective view showing the combined sheet and sales and record slip arranged in a holder for positioning the foot during the measurement thereof.

In order that the foot to be measured and fitted may be held in the proper position with reference to the scales during the plotting of the foot, it is preferable to provide a foot holder or foot positioning means, so constructed as to position the heel and one side, preferably the inner side of the foot. A convenient means for this purpose is a box or tray or other receptacle, such as that illustrated in the drawing, Fig. 2, wherein the rear or heel wall H of the receptacle is raised, whereas the front wall K is cut away or notched as shown at L, to facilitate the removal of the chart, the rear wall forming a transverse (or heel) and the side wall M the longitudinal positioning means for the foot, and a box or receptacle of this kind is also convenient in the fact that a number of charts can be positioned therein and successively removed as they are used, although a chart may be indicated on the bottom of the box itself, as for example, when the latter is made of pasteboard or other light material designed, for example, to be used in mail order business. It will be understood that the receptacle or holder or positioning device may be of any desired material, as for example, wood, metal, cardboard, or otherwise. Also, a chart may be used independently of the holder by using the transverse and longitudinal margins thereof as the positioning means.

It is in order to secure the utmost comparative compactness or narrowness of the chart and holder, and yet provide for measuring each foot, that is to say, the right foot and left foot, independently, that the scales are placed in such relation that the foot width scale graduations intersect each other as hereinbefore described, and yet may be so distinguished and designated as to avoid any confusion in the use of the article.

Heretofore it has been usual to provide measuring means with different scales and graduations for adults and for children and also in many cases, to provide for different scales and graduations for men's feet and women's feet, but by the arrangement herein described, it is possible to use one set of scales and graduations for all, and yet secure accuracy in the fitting of the shoes or the designation of the sizes and lasts of shoes to be used comfortably and with proper regard to the shape of the foot.

Having arranged one of the combined sheets, including the measuring scale with the retailer's advertising medium spaces thereon and the attached sales and record slip within the holder or positioning device, it being usual to have quite a number of these combined sheets arranged at the bottom of said holder, the foot of the customer is placed in the holder or positioning device with the heel located in accordance with the instructions at the top of the sheet and against the raised end wall of the holder with the inner side of the foot against the side wall of the holder or positioning device, lightly touching the same. The length scale is then read in accordance with the explanations hereinabove given, while a tracing of the plan of the foot by passing a pencil around the outer contour and end of the foot is produced, the width of the shoe to be fitted being read on the diagonal scale, selecting that graduation which corresponds with the width diagonal line touched by the diagram of the foot at its widest point. Owing to the peculiar and indicated inclination of these width lines, they are adapted uniformly for the measurement of the width of the feet of children and adults, both men and women, without making any allowance for variations in shape or development. The correct inclination of these diagonal lines has been discovered by careful study and experimentation to produce a single scale both as to length and width, which will be adapted for both adults' and children's feet.

This has been accomplished by laying out one of these lines at an angle to the normal or length measure, this angle being determined by locating upon the chart say two points which represent the width at their widest part of two lasts of different lengths but having the same width designation, said points being located in proper relation to the lengths of said lasts, and drawing a line through them and other lines, similarly determined, parallel thereto to represent the other width designations, this angle being, as stated above, approximately 20 degrees.

Claims:—

1. An adult and children's foot measuring and shoe fitting chart having longitudinal and transverse foot positioning means, a foot length scale parallel with the longitudinal positioning means and provided with distinguishably designated graduations to indicate foot lengths, and a foot width scale having graduations consisting of parallel lines diagonally disposed with reference to said foot length scale and diverging from the same from heel to toe, at an angle of approximately twenty degrees, said lines being distinguishably designated by foot width indications representing respectively men's, women's and children's foot width measurements.

2. A universal adults' and children's foot measuring and shoe-fitting chart having right and left foot length scales and intermediate distinguishably designated foot width scales consisting of distinguishable sets of parallel lines disposed respectively divergent from heel to toe with reference to the corresponding foot length scales and crossing each other, the graduations of each foot width scale being distinguishably designated to represent foot width measurements.

3. An adult and children's foot measuring and shoe fitting chart having longitudinal and transverse foot positioning means, there being right and left foot length scales on opposite edges of the chart and parallel with the longitudinal positioning means, said scales consisting of distinguishably designated graduations to indicate foot lengths, and foot width scales each having graduations consisting of a set of parallel lines diagonally disposed with reference to its corresponding foot length scale and diverging from the same from heel to toe at an angle of approximately twenty degrees, said lines being distinguishably designated by foot width indications representing respectively men's, women's and children's foot width measurements.

4. An adult and children's foot measuring and shoe fitting chart having longitudinal and transverse foot positioning means, there being right and left foot length scales on opposite sides of the sheet and parallel with the longitudinal positioning means, said scales consisting of distinguishably designated graduations to indicate foot lengths, and foot width scales each having graduations consisting of a set of parallel lines which cross those of the other set and are of a different character so as to be distinguishable therefrom, each set of parallel lines being diagonally disposed with reference to its corresponding foot length scale and diverging from the same from heel to toe, at an angle of approximately twenty degrees, said lines being distinguishably designated by foot width indications representing respectively men's, women's and children's foot width measurements.

In testimony that I claim the foregoing as my own, I have hereto affixed my signature in the presence of two witnesses.

AUSTAVE PAUL PHILLIPS.

Witnesses:
   J. E. KNIPER,
   MEDILLA DAREZ.